United States Patent [19]

Chakrabarti

[11] 4,179,331
[45] Dec. 18, 1979

[54] GLASS FIBER DISPERSIONS FOR MAKING UNIFORM GLASS FIBER MATS BY THE WET-LAID PROCESS

[75] Inventor: Paritosh M. Chakrabarti, Wayne, N.J.

[73] Assignee: GAF Corporation, New York, N.Y.

[21] Appl. No.: 851,683

[22] Filed: Nov. 15, 1977

[51] Int. Cl.² .......................................... D21F 11/00
[52] U.S. Cl. ................................. 162/156; 162/158; 162/184; 162/185
[58] Field of Search ............... 162/152, 156, 145, 158, 162/183, 184, 182, 185; 65/3 C; 428/361, 378, 401, 436; 427/384, 385

[56] References Cited

U.S. PATENT DOCUMENTS

| | | | |
|---|---|---|---|
| 3,228,825 | 1/1966 | Waggoner | 162/156 |
| 3,573,158 | 3/1971 | Pall et al. | 162/156 |
| 3,766,003 | 10/1973 | Schuller et al. | 162/156 |

FOREIGN PATENT DOCUMENTS 838373 2/1975 Belgium.

*Primary Examiner*—S. Leon Bashore
*Assistant Examiner*—Peter Chin
*Attorney, Agent, or Firm*—Walter C. Kehm; Walter Katz

[57] ABSTRACT

In accordance with the present invention, there is provided herein improved glass fiber dispersions for making uniform glass fiber mats by the wet-laid process. The well dispersed glass fiber compositions of this invention usually are prepared by mixing chopped glass fiber bundles in water with a small amount of an amine oxide surfactant to disperse the bundles into individual fibers. As a feature of the invention, the dispersions may be formed at relatively high glass fiber consistencies. The resultant dispersions then are used to make very high quality glass fiber mats at high rates of production.

22 Claims, No Drawings

GLASS FIBER DISPERSIONS FOR MAKING UNIFORM GLASS FIBER MATS BY THE WET-LAID PROCESS

BACKGROUND OF THE INVENTION

1. Field of the Invention

This invention relates to the manufacture of uniform glass fiber mats by the wet-laid process, and more particularly, it is concerned with improved glass fiber dispersion compositions for use in such a process.

2. Description of the Prior Art

High strength, uniform, thin sheets or mats of glass fibers are finding increasing application in the building materials industry, as for example, in asphalt roofing shingles and as backing sheets for vinyl flooring. These glass fiber mats are replacing similar sheets made traditionally of asbestos fibers. Glass fiber mats usually are made commercially by a wet-laid process, which is carried out on modified paper making machinery, as described, for example, in the book by O. A. Battista, *Synthetic Fibers in Papermaking* (Wiley) N.Y. 1964. A number of U.S. patents also provide a rather complete description of a wet-laid process, including U.S. Pat. Nos. 2,906,660; 3,012,929; 3,021,255; 3,050,427; 3,103,461; 3,108,891; 3,228,825; 3,634,054; 3,749,638; 3,760,458; 3,766,003; 3,838,995 and 3,905,067. The German OLS No. 2454354 (Fr. Demande No. 2,250,719), June, 1975, also is pertinent art in this field.

In general, the known wet-laid process for making glass fiber mats comprises first forming an aqueous suspension of short-length glass fibers under agitation in a mixing tank, then feeding the suspension through a moving screen on which the fibers enmesh themselves while the water is separated therefrom. However, unlike natural fibers, such as cellulose or asbestos, glass fibers do not disperse well in water. Actually, when glass fibers, which come as strands or bundles of parallel fibers, are put into water and stirred, they do not form a well-dispersed system. In fact, upon extended agitation, the fibers agglomerate as large clumps which are very difficult to redisperse.

In an attempt to overcome this inherent problem with glass fibers, it has been the practice in the industry to provide suspending aids for the glass fibers, including surfactants, in order to keep the fibers separated from one another in a relatively dispersed state. Such suspending aids usually are materials which increase the viscosity of the medium so that the fibers can suspend themselves in the medium. Some suspending aids actually are surfactants which function by reducing the surface attraction between the fibers. Unfortunately, however, none of the available suspending aids are entirely satisfactory for large volume manufacture of useful, uniform glass fiber mats.

For example, such polymeric suspending aids materials as polyacrylamides, hydroxyethyl cellulose and the like, provide a highly viscous aqueous solutions at high material concentrations, but which is difficult to handle, and particularly, which drains very slowly through the mat forming screen, or foraminous belt. Furthermore, the degree of the suspension formed using such materials is only fair, and suspensions having a fiber consistency of more than 0.005% give poor quality mats. The viscous suspensions also trap air upon agitation near the formation zone to form stable foams which adversely affect the uniformity and strength of the mats. Finally, the polymers are not effective at low concentrations, and so are expensive for use in what should be a low cost process.

A number of surfactant materials also have been tried for dispersing glass fibers in water, for example, the cationic nitrogen surfactants described in Ger. DT No. 2454354/Fr. Demande No. 2,250,719 (June, 1975). With these surfactants, the glass fiber filaments are drawn from an extruder nozzle, coated with the cationic surfactant, and moistened before chopping into short-length fibers. The chopped fibers then are compounded in another aqueous solution of a cationic surfactant. Accordingly, in this process, the cationic surfactants are applied in two stages to form an aqueous provide acceptable mats at reasonable speeds of mat production. Furthermore, the quality of the dispersions using the materials of this patent application also is poor.

Therefore, it is apparent that for a glass fiber dispersion technique to be effective, it is necessary that the dispersions meet several rigid criteria simultaneously which can provide means for making the desired high quality, uniform glass fiber mats at a rapid rate of production in an economically acceptable process. Such criteria are listed below:

1. The dispersing surfactant should provide a uniform dispersion of glass fibers in water effectively at low surfactant concentrations.

2. The dispersions should be efficient at high glass fiber consistencies so that the mats may be formed without having to expend an unnecessarily large amount of energy to separate and handle large quantities of water.

3. The dispersion compositions preferably should not be accompanied by a substantial increase in the viscosity of the medium, which would necessitate extensive pumping equipment at the screen to separate the fibers from the water, and which would make drying of the wet mat difficult.

4. The dispersion compositions should be capable of producing glass fiber mats which have a uniform distribution of fibers characterized by a multidirectional array of fibers. The finished mat product should possess uniform high-strength properties, particularly good tensile strength.

5. The dispersions should be capable of use in the wet-laid process in conventional equipment, at high rates of mat production, without generation of unwanted foams, and without corroding the plant machinery.

6. The surfactant materials preferably should be readily available, at low cost, and be capable of use either by direct addition to the fibers in water, or by precoating the fibers with the surfactant before admixing with water to form the aqueous dispersion composition.

These and other objects and features of the invention will be made apparent from the following more particular description of the invention.

SUMMARY OF THE INVENTION

In accordance with the present invention, there is provided herein improved glass fiber dispersions for making uniform glass fiber mats by the wet-laid process. The well dispersed glass fiber compositions of this invention usually are prepared by mixing chopped glass fibers in water with a small amount of an amine oxide surfactant. As a feature of the invention, the dispersions may be formed at relatively high glass fiber consistencies. The resultant dispersions then are used to make very high quality glass fiber mats at high rates of production.

The amine oxide surfactants of the invention are tertiary amine oxides having the formula:

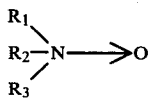

where $R_1$, $R_2$ and $R_3$ suitably are hydrocarbon groups containing between 1–30 carbon atoms. The hydrocarbon groups can be aliphatic or aromatic, and, if aliphatic, can be linear, branched or cyclic in nature, and can be the same or different in each radical. The aliphatic hydrocarbon radical can contain ethylenic unsaturation. Preferably the aliphatic groups are selected from among alkyl groups, such as lower alkyl or hydroxyalkyl groups having from 1–4 carbon atoms, and substituted alkyl groups thereof, or long chain alkyl groups, having from 12–30 carbon atoms, such as stearyl, laurel, oleyl, tridecyl, tetradecyl, hexadecyl, dodecyl, octadecyl, nonadecyl, or substituted groups thereof, derived from natural or synthetic sources. The sum of the $R_1$, $R_2$ and $R_3$ groups is about 14–40 carbon atoms, and most preferably, about 18–24 carbon atoms.

DETAILED DESCRIPTION OF THE INVENTION

In a typical wet-laid process for making glass fiber mats, a stock suspension of the fibrous material of predetermined fiber consistency is prepared in a mixing tank. The suspension then is pumped into a head box of a paper-making machine where it may be further diluted with water to a lower consistency. The diluted suspension then is distributed over a moving foraminous belt under suction to form a non-woven fiber structure or wet mat on the belt. This wet mat structure may be desired, if necessary, then treated with a binder, and, finally, thoroughly dried to give a finished non-woven mat product.

In the process of the present invention for the production of glass fiber mats, the glass fiber filaments or strands generally are chopped into bundles of fibers about ¼" to 3" in length, usually about ½" to 2", and preferably about 1" long, and usually about 3 to 20 microns in diameter, and, preferably about 15 microns. In one embodiment, the fibers are added to water containing the amine oxide surfactant of the invention to form a well-dispersed composition. Suitably, the amine oxide is present at a concentration of about 5–500 ppm of the solution and preferably about 10–25 ppm. Alternatively, the chopped glass fibers may be coated initially by spraying or otherwise applying the amine oxide surfactant thereon, and then dispersing the coated fibers in the aqueous medium. Suitably, the coated fibers contain about 0.01 to 1% by weight of the amine oxide, and, preferably, between 0.025 to 0.25%.

As a feature of the invention, the glass fibers may be dispersed in the amine oxide surfactant at relatively high fiber consistencies while still retaining the effective dispersion characteristics of the composition. For example, a fiber consistency of from about 0.001% to about 3.0% may be used, and, preferably, about 0.05% to about 1% is employed, based upon the weight of the fibers in the water. Such compositions furnish excellent dispersions when agitated in conventional mixing equipment. As mentioned, if desired, the highly concentrated fiber dispersion compositions may be diluted at the head box, usually to a consistency of about 0.1% to about 0.3%, and, preferably about 0.2%, which, however, is still a highly concentrated fiber dispersion by conventional standards.

The dispersion compositions of the invention are formed without any substantial change in the viscosity of the medium, or of generation of unwanted foams during the process. Furthermore, the dispersions preferably are prepared at or near a neutral pH condition, or perhaps under slightly alkaline conditions, again, without affecting the good quality of the dispersions, or of the finished glass mat products produced therefrom.

The dispersion compositions of the invention produce glass fiber mats which have a high density of fibers therein which are uniformly distributed throughout the mat in a multidirectional array. The finished mats show excellent tensile strength properties, too. The rate of production of the mats is very rapid, indeed, in this invention. In fact, a rate of mat production of over 500 linear ft./min. using conventional paper-making equipment is readily achievable in this process.

The examples which follow will further illustrate the invention, but are not to be considered as being limiting of the principles or practice of the invention.

In Example 1, which includes Tables I and II below, is a compilation of experimental data to compare the dispersing abilities of the amine oxide surfactants of the invention with other well-known surfactant materials of the prior art. In Table I, compounds 1–4, Group A, illustrate some of these amine oxides. The remaining compounds 5–25, Groups B–H, are representative of other surfactant materials.

For these tests, the surfactant compounds were dissolved in water at various concentrations, ranging from 100 ppm (0.01%) to 5 ppm (0.0005%) by weight of the surfactant in water. To 100 ml of the surfactant solution was added 1 g of chopped E-glass fiber strands (a 1% fiber consistency), which were 1½" in length and 15 microns in diameter. The mixture then was agitated for 5 minutes.

The quality of a given dispersion was rated on a scale of 1 to 5; a rating of 1 was given to a poorest suspension where the fiber strands agglomerated and/or did not open up as individual fibers. The control was a surfactant free system which was rated as 1. The highest quality dispersions were rated as 5 in which substantially all the fibers were separated from each other. Intermediate ratings of 4, 3 or 2 indicated a gradual trend towards balling-up of fibers.

EXAMPLE 1

DIRECT FORMATION OF DISPERSION COMPOSITIONS BY ADDITION OF SURFACTANT TO GLASS FIBERS AND QUALITY RATINGS THEREOF

Table I

| | | Surfactant Compounds Used | | |
|---|---|---|---|---|
| | | Group A - Amine Oxides | | |
| Compound No. | Trademark Name | Source | Chemical Name | Chemical Structure |

Table I-continued

| | | | | |
|---|---|---|---|---|
| 1 | Aromox DMHT | Armak | Dimethyl hydrogenated tallow amine oxide | $R_{HT}-\overset{CH_3}{\underset{CH_3}{N}}\rightarrow O$ |
| 2 | Ammonyx SO | Onyx | Dimethylstearylamine oxide | $C_{18}H_{37}-\overset{CH_3}{\underset{CH_3}{N}}\rightarrow O$ |
| 3 | Aromox DM16 | Armak | Dimethylhexadecylamine oxide | $C_{16}H_{33}-\overset{CH_3}{\underset{CH_3}{N}}\rightarrow O$ |
| 4 | Aromox T/12 | Armak | Bis(2-hydroxyethyl) tallow amine oxide | $R_T-\overset{CH_2CH_2OH}{\underset{CH_2CH_2OH}{N}}\rightarrow O$ | where $R_T$ = 3% tetradecyl, 27% hexadecyl, 16% octadecyl, 48% octadecenyl and 6% octadecadienyl.
$R_{HT}$ = hydrogenated $R_T$ (saturated)

Group B - Quaternary Amine Salts

| Compound No. | Trademark Name | Source | Chemical Name | Chemical Structure |
|---|---|---|---|---|
| 5 | Arquad 18-50 | Armak | Trimethyl stearyl ammonium chloride | $C_{18}H_{37}-\overset{CH_3}{\underset{CH_3}{N^+}}-CH_3\ Cl^-$ |
| 6 | Arquad T-50 | Armak | Trimethyl Tallow ammonium chloride | $R_T-\overset{CH_3}{\underset{CH_3}{N^+}}-CH_3\ Cl^-$ |
| 7 | Ethoquad T12 | Armak | Methyl Diethoxy Tallow ammonium chloride | $R_T-\overset{CH_2CH_2OH}{\underset{CH_2CH_2OH}{N^+}}-CH_3\ Cl^-$ |
| 8 | Ethoquad C25 | Armak | Methyl Poly (15) ethoxylated coco ammonium chloride | $R_C-\overset{(CH_2CH_2O)_xH}{\underset{(CH_2CH_2O)_yH}{N^+}}-CH_3\ Cl^-$ <br> x + y = 15 |
| 9 | Gaftex CDL | GAF | Trimethyl benzyl ammonium chloride | $C_6H_5CH_2-\overset{CH_3}{\underset{CH_3}{N^+}}-CH_3\ Cl^-$ |
| 10 | Armac T | Armak | Tallow amine acetate | $R_T NH_3^+ \ ^-O\ OCCH_3$ | where $R_T$ is as defined above, and
$R_c$ is 8% octyl, 9% decyl, 47% dodecyl, 18% tetradecyl, 8% hexadecyl and 10% octadecyl.

Group C - Polyethoxylated Amines

| Compound No. | Trademark Name | Source | Chemical Name | Chemical Structure |
|---|---|---|---|---|
| 11 | Ethomeen C25 | Armak | Poly (15) ethoxylated cocoamine | $R_C-\overset{(CH_2CH_2O)_x H}{\underset{(CH_2CH_2O)_y H}{N}}$ <br> x + y = 15 |
| 12 | Ethomeen T12 | Armak | Diethoxy tallowamine | $R_T-\overset{CH_2CH_2OH}{\underset{CH_2CH_2OH}{N}}$ |
| 13 | Ethomeen T15 | Armak | Poly (5) ethoxylated tallowamine | $R_T-\overset{(CH_2CH_2O)_x H}{\underset{(CH_2CH_2O)_y H}{N}}$ <br> x + y = 5 |

Group D - Polyethoxylated Amides

| Compound No. | Trademark Name | Source | Chemical Name | Chemical Structure |
|---|---|---|---|---|
| 14 | Gafamide CDD | GAF | Coconut diethanol amide | $R_C CON\overset{CH_2CH_2OH}{\underset{CH_2CH_2OH}{}}$ |

Table I-continued where $R_cCO$ is an acyl radical derived from coconut oil.

Group-E - Polyoxyethylene Alkylphenols

| Compound No. | Trademark Name | Source | Chemical Name |
|---|---|---|---|
| 15 | Igepal CO-430 | GAF | Nonylphenoxy poly (ethyleneoxy) ethanol of HLB 8.8 |
| 16 | Igepal CO-710 | GAF | Nonylphenoxy poly (ethyleneoxy) ethanol of HLB 13.6 |

Group-F - Polyoxyalkylene Alcohols

| Compound No. | Trademark Name | Source | Chemical Name |
|---|---|---|---|
| 17 | Antarox BL-225 | GAF | Nonionic Aliphatic polyether |
| 18 | Antarox BL-330 | GAF | Modified Nonionic Aliphatic polyether |

Group-G - Polyalkylene Oxide Copolymers

| Compound No. | Trademark Name | Source | Chemical Name |
|---|---|---|---|
| 19 | Pluronic L-121 | BASF-Wyandotte | Ethylene oxide propylene oxide condensation |
| 20 | Pluronic F-127 | Same | Same |

Group-H - Anionic Surfactants

| Compound No. | Trademark Name | Source | Chemical Name | Chemical Structure |
|---|---|---|---|---|
| 21 | — | — | Sodium oleate | $C_{17}H_{33}\overline{COO}Na^+$ |
| 22 | — | — | Sodium dodecyl benzene sulfonate | $C_{12}H_{25}C_6H_4SO_3^-Na^+$ |
| 23 | Gafac RO-310 | GAF | Complex Organic phosphate ester (anionic) surfactant | Organic Phosphates |
| 24 | Gafac RM-410 | GAF | Same | Same |
| 25 | Alipal CO-433 | GAF | Sodium salt of a sulfate ester of an alkylphenoxy poly(ethyleneoxy) ethanol | |

Table II

QUALITY RATINGS OF GLASS FIBER DISPERSIONS USING THE SURFACTANT COMPOUNDS OF TABLE I AT VARIOUS CONCENTRATIONS

Quality Rationgs Concentration [1]

| | 100 ppm | 50 ppm | 25 ppm | 5 ppm |
|---|---|---|---|---|
| Control | | | | |
| No surfactant | | 1 | | |
| Group A Compound | | | | |
| 1 | 5 | 5 | 5 | 3 |
| 2 | 5 | 5 | 5 | 3 |
| 3 | 5 | 4 | 4 | 3 |
| 4 | 5 | 5 | 5 | 3 |
| Group B Compound | | | | |
| 5 | 2 | 2 | 1 | 1 |
| 6 | 2 | 2 | 1 | 1 |
| 7 | 2 | 2 | 1 | 1 |
| 8 | 2 | 1 | 1 | 1 |
| 9 | 2 | 2 | 1 | 1 |
| 10 | 2 | 1 | 1 | 1 |
| Group C Compound | | | | |
| 11 | 2 | 2 | 1 | 1 |
| 12 | 2 | 1 | 1 | 1 |
| 13 | 1,2 | 1 | 1 | 1 |
| Group D Compound | | | | |
| 14 | 1,2 | 1 | 1 | 1 |
| Group E Compound | | | | |
| 15 | 2,3 | 2 | 1 | 1 |
| 16 | 1,2 | 1,2 | 1 | 1 |
| Group F Compound | | | | |
| 17 | 1,2 | 1,2 | 1 | 1 |
| 18 | 1,2 | 1,2 | 1 | 1 |
| Group G Compound | | | | |
| 19 | 1,2 | 1,2 | 1 | 1 |
| 20 | 1,2 | 1,2 | 1 | 1 |
| Group H Compound | | | | |
| 21 | 1 | 1 | 1 | 1 |
| 22 | 1 | 1 | 1 | 1 |
| 23 | 1 | 1 | 1 | 1 |
| 24 | 1 | 1 | 1 | 1 |
| 25 | 1 | 1 | 1 | 1 |

[1] In terms of 100% active material.

From the data in Tables I and II, it is evident that the amine oxide surfactants of the invention (Group A) are outstandingly superior to the other surfactants in their ability to form uniform dispersion glass fiber compositions in water. The cationic surfactants (Group B), for example, are poor dispersing agents for glass fibers, particularly at low concentrations. Similarly, the other surfactants (Groups C–H) also form very poor fiber dispersions, irrespective of their concentration. In summary, only the surfactants of Group A exhibit high quality dispersion ratings and as will be shown later, they form the desired high quality glass fiber mats in the wet-laid process suitable for use in the building material industry.

EXAMPLE 2

COATING OF GLASS FIBERS WITH SURFACTANT PRIOR TO FORMING DISPERSIONS AND QUALITY RATINGS THEREOF

In these tests, weighed chopped E-glass (1½" in length, 15 microns in diameter) were coated with surfactant by stirring the fibers into solutions of representative surfactant compounds of Table I at concentrations of 1%, 0.2% and 0.1% by weight of the surfactant. The solutions then were filtered and reweighed. The increase in weight of the fibers was attributed to the surfactant coating thereon. The fibers treated with 1%, 0.2% and 0.1% surfactant solutions, respectively, thus contained 0.35%, 0.07% and 0.035% surfactant material based on the initial weight of the fibers. The thus-coated chopped glass fibers then were added to water (1 g/100 ml) with stirring and the quality ratings of the dispersion obtained and compared as before.

Table III

| Surfactant Compound No. | Quality Ratings at Various Surfactant Content Based Upon Weight of Fibers | | |
|---|---|---|---|
| | 0.35% | 0.07% | 0.035% |
| 1 | 5 | 5 | 4 |
| 5 | 2 | 1 | 1 |
| 11 | 2 | 1 | 1 |
| 14 | 1,2 | 1 | 1 |

The data in Table III shows that the amine oxide surfactant compound 1 of the invention provides outstanding dispersion compositions when applied also as a pre-coat to the fibers, and that this result is achieved even with only small amounts of the surfactant on the surface of the fibers. The other surfactant materials, however, give very poor results even at high concentrations.

EXAMPLE 3

EFFECT OF pH AND WATER HARDNESS ON DISPERSION QUALITY

In this example, compound 1 was dissolved in water at various pH and water hardness conditions. The surfactant concentration was 25 ppm and the fiber consistency was 1 g/100 ml of water.

Table IV

| pH | Water hardness ppm[1] | Dispersion Quality |
|---|---|---|
| 5 | 0 | 5 |
| 7 | 0 | 5 |
| 9 | 0 | 5 |
| 5 | 100 | 5 |
| 7 | 100 | 5 |
| 9 | 100 | 5 |
| 5 | 300 | 5 |
| 7 | 300 | 5 |
| 9 | 300 | 5 |

[1]Expressed as ppm of $CaCO_3$.

This example indicates that the surfactant of the present invention functions well at or near neutral conditions, or in basic solution, and its dispersion quality is irrespective of the degree of hardness of the aqueous medium.

EXAMPLE 4

FORMATION OF GLASS FIBER MATS BY WET-LAID PROCESS WITH DISPERSIONS USING THE SURFACTANT COMPOUNDS OF THE INVENTION

To 7 liters of a 20 ppm solution of amine oxide surfactant compound 1 was added 7 g of chopped E-glass (1½" long, 15 microns diameter) with stirring to form the usual good dispersion. The dispersion then was carried through the laboratory Williams paper-making apparatus to form a 10"×1" mat product. The glass fibers in this mat were very evenly distributed throughout. After formation, the mat was treated carefully with urea-formaldehyde resin and cured in the usual manner. The finished mat product had a 85% fiber content and contained 15% resin. The fiber density was about 2 lbs/100 sq. ft. of mat area.

EXAMPLE 5

The procedure of Example 4 was repeated with compound 1 using 3.5 g of glass fibers. The resultant mat had a density of 1 lb/100 sq. ft. of mat area, and exhibited a uniform distribution and a multidirectional array of fibers therein.

EXAMPLE 6

Example 4 was repeated using 14 g of glass fibers in place of 7 g of fibers. The mat formed had a density of about 4 lbs/100 sq. ft. and again was of excellent quality.

EXAMPLE 7

In the following example, a conventional pilot production unit was employed. A 0.5% glass fiber dispersion was prepared in a mixing tank using 20 ppm solution of surfactant compound 1. This dispersion was pumped into the headbox of the pilot machine and simultaneously diluted with fresh 20 ppm solution of surfactant 1 in water to give a final glass consistency in the headbox of 0.14%. This diluted dispersion then was distributed onto a moving foraminous belt at a rate such that a mat of 2 lbs. fiber/100 sq. ft. was obtained. The mat so formed was of excellent quality insofar as uniformity of fiber distribution and fiber array was concerned. No foaming was encountered in the machine at the concentration of the surfactant used in the process.

EXAMPLE 8

This experiment was run using 300 ppm hardness water, 10 ppm surfactant compound 1 and enough E-glass fiber (¼" to 1" long) to give an approximately 2 lbs./100 sq. ft. mat. The rate of production was 535 linear ft/min. The mat then was treated with urea-formaldehyde binder (15% based on weight of the mat), and cured to give a finished mat product of excellent physical properties and fiber distribution.

EXAMPLE 9

Rolled carbon steel vessels (approximately 15 g each) were weighed and submerged in 225 ml of tap water (50 ppm as $CaCO_3$ hardness) alone, and in tap water containing 200 ppm of surfactant compound 1. After 120 hours at room temperature, the vessels were removed, washed and reweighed. The solutions also were analyzed for iron content. The results of the experiments are shown in Table V.

Table V

| Solution | % wt. loss of vessel after 120 hrs. | Iron in solution after 120 hrs. (in ppm) |
|---|---|---|
| Water alone | 0.17 | 80 |
| Water containing 200 ppm surfactant Compound 1 | 0.12 | 44 |

The results demonstrate that the surfactants of the invention do not corrode the steel machinery used in mat formation.

B. COMPARATIVE EXAMPLES WITH OTHER SURFACTANTS

EXAMPLE 10

Example 4 was repeated using the surfactant of compound 5 in place of that of compound 1. The mat was of unacceptable quality with considerable clumping of fibers at different areas.

EXAMPLE 11

Example 9 was repeated using surfactant compound 5 at a 100 ppm concentration. The quality of the mat was still unacceptable with areas of considerable fiber clumping and relatively poor fiber concentration.

EXAMPLE 12

Example 10 was repeated using the surfactant of Example 11 in place of the surfactant of Example 5. The mat again was of unacceptable quality.

While the invention has been described with reference to certain embodiments thereof, it will be understood by those skilled in the art that certain changes and modifications may be made which are within the skill of the art. Accordingly, it is expected to be limited by the appended Claims only, in which:

What is claimed is:

1. In the manufacture of uniform glass mats at a high rate of production by the wet-laid process, the improved method which comprises
    forming an aqueous dispersion of glass fibers by mixing bundles of said fibers of about ¼ to 3 inches in length in an aqueous medium at a fiber consistency of about 0.001 to 3.0% with about 5–500 ppm of an amine oxide surfactant having the formula:

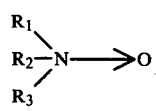

where $R_1$, $R_2$, and $R_3$ are selected from the group consisting of aliphatic and aromatic hydrocarbon radicals, substituted or unsubstituted, containing between 1 and 30 carbon atoms, being the same or different, the sum of $R_1$, $R_2$ and $R_3$ being between about 14 to 40, thereby to substantially disperse said bundles into individual fibers within the aqueous medium, and,
    passing said dispersion through a mat-forming screen to form the desired uniform glass fiber mat.

2. A method according to claim 1 wherein the $R_1$, $R_2$ and $R_3$ radicals are aliphatic radicals.

3. A method according to claim 2 wherein said radicals are selected from alkyl, hydroxyalkyl and substituted radicals thereof.

4. A method according to claim 1 wherein said sum is about 18 to 24.

5. A method according to claim 1 wherein at least one of said radicals is lower alkyl or hydroxy lower alkyl, and at least one of said radicals is a long chain alkyl or alkyl substituted group.

6. A method according to claim 1 wherein said amine oxide is present in an amount of about 5–100 ppm of said aqueous dispersion.

7. A method according to claim 1 wherein said amount of amine oxide is about 10–25 ppm.

8. A method according to claim 1 wherein said glass fibers are diluted from a more concentrated consistency to a lower consistency before being passed through said mat-forming screen.

9. A method according to claim 1 wherein consistency is about 0.05 to about 1%.

10. A method according to claim 1 wherein said amine oxide is dimethyl hydrogenated tallow amine oxide.

11. A method according to claim 1 wherein said amine oxide is dimethylstearylamine oxide.

12. A method according to claim 1 wherein said amine oxide is dimethylhexadecylamine oxide.

13. A method according to claim 1 wherein said amine oxide is bis(2-hydroxyethyl) tallow amine oxide.

14. A method according to claim 1 wherein said fibers are about ½ to 2 inches in length.

15. A method according to claim 1 wherein said fibers are about 3 to about 20 microns in diameter.

16. A method according to claim 1 further characterized in that the dispersion is prepared at or near a neutral pH condition.

17. A method according to claim 1 further including the steps of drying and curing said mat with a binder to form a finished mat product of high quality.

18. A method according to claim 1, wherein said fibers are about 1 inch in length.

19. A method according to claim 1, wherein said fibers are about 15 microns in diameter.

20. A method according to claim 1 which further comprises:
    (a) precoating said glass fibers with said amine oxide, having the formula of claim 1, and;
    (b) adding said thus-coated fibers to an aqueous medium to form said desired dispersion.

21. A method according to claim 20 wherein said coated fibers contain about 0.01 to 1% by weight of the amine oxide.

22. A method according to claim 21 wherein the fibers are coated with between 0.025 to 0.25% of the amine oxide.

* * * * *